United States Patent [19]

James. Jr.

[11] Patent Number: 4,483,766

[45] Date of Patent: Nov. 20, 1984

[54] PROCESS FOR CATALYTIC REFORMING

[75] Inventor: Robert B. James. Jr., Northbrook, Ill.

[73] Assignee: UOP Inc., Des Plaines, Ill.

[21] Appl. No.: 506,184

[22] Filed: Jun. 20, 1983

[51] Int. Cl.³ .............................................. C10G 35/04
[52] U.S. Cl. .................................... 208/134; 208/101
[58] Field of Search .............................. 208/134, 101

[56] References Cited

U.S. PATENT DOCUMENTS

| | | | |
|---|---|---|---|
| 3,364,137 | 1/1968 | Bergendorf et al. | 208/139 |
| 3,431,195 | 3/1969 | Storch et al. | 208/101 |
| 3,516,924 | 6/1970 | Forbes | 208/65 |
| 3,520,799 | 7/1970 | Forbes | 208/101 |
| 3,520,800 | 7/1970 | Forbes | 208/101 |
| 3,882,014 | 5/1975 | Monday et al. | 208/134 |
| 4,212,726 | 7/1980 | Mayes | 208/101 |
| 4,364,820 | 12/1982 | DeGraff et al. | 208/101 |
| 4,374,726 | 2/1983 | Schmelzer et al. | 208/101 |

Primary Examiner—Curtis R. Davis
Attorney, Agent, or Firm—James R. Hoatson, Jr.; John F. Spears, Jr.; William H. Page, II

[57] ABSTRACT

An improved catalytic reforming process is disclosed wherein hydrogen and light hydrocarbons generated in the catalytic reaction zone are passed to a hydrogen production/purification zone and are reacted and processed therein to produce substantially pure hydrogen. A portion of the hydrogen is then admixed with the charge stock to the catalytic reforming zone to provide the hydrogen requirements of the catalytic reforming reaction zone.

15 Claims, 1 Drawing Figure

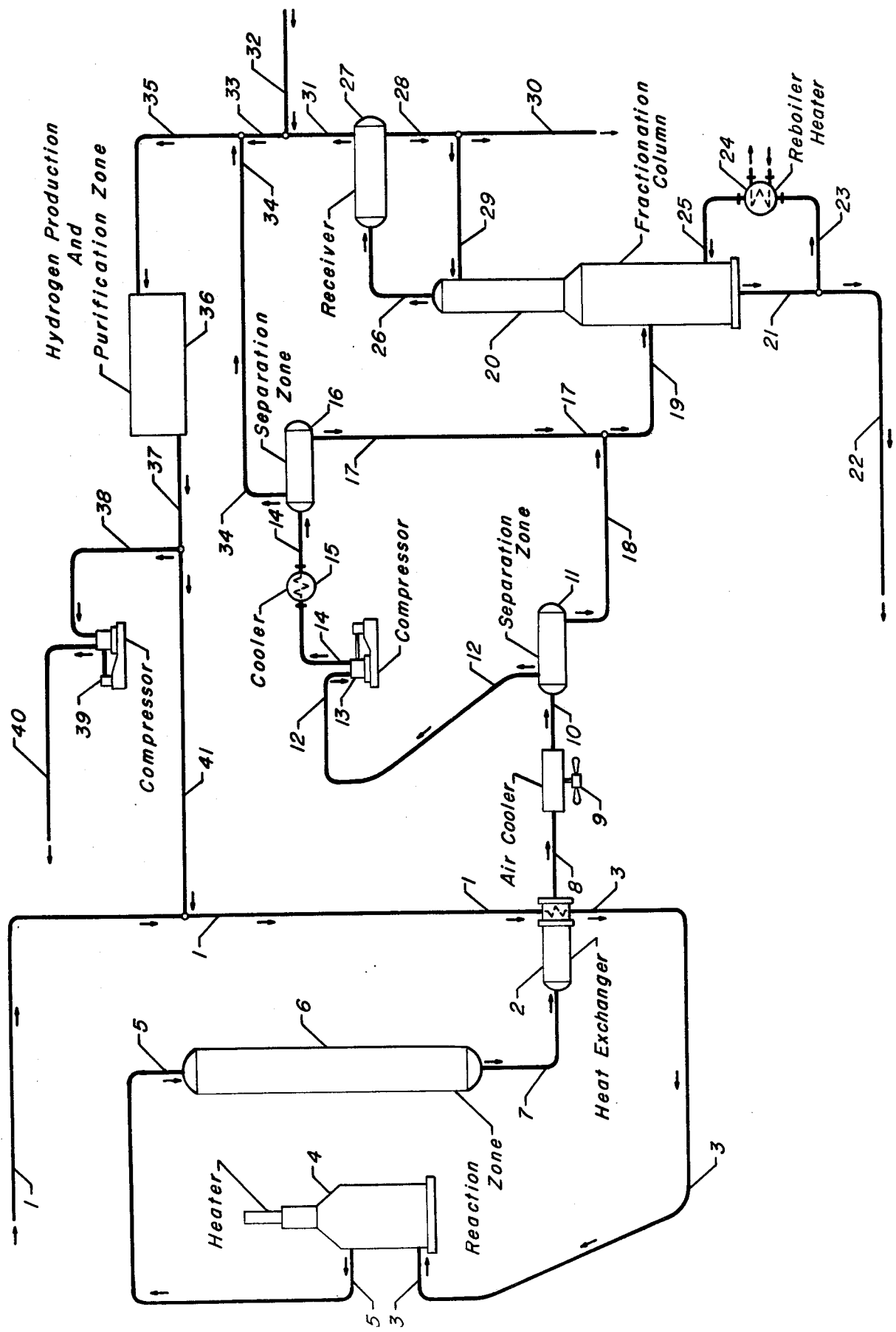

PROCESS FOR CATALYTIC REFORMING

BACKGROUND OF THE INVENTION

The present invention is directed toward an improved process for catalytic reforming. More particularly, the described inventive technique is adaptable for utilization in a low pressure catalytic reforming process.

Various types of catalytic hydrocarbon conversion reaction systems have found widespread utilization throughout the petroleum and petrochemical industries for effecting the conversion of hydrocarbons to a multitudinous number of products. Reactions employed in such systems often result in either the net production of hydrogen or the net consumption of hydrogen. Typical of the net hydrogen-producing hydrocarbon reaction systems are catalytic reforming, catalytic dehydrogenation of alkylaromatics, and catalytic dehydrogenation of paraffins. Of the above-mentioned net hydrogen-producing reaction systems, catalytic reforming ranks as one of the most widely employed. By virtue of its wide application and its utilization as a primary source of hydrogen for the petroleum refinery or petrochemical complex, catalytic reforming has become well known in the art of hydrocarbon conversion reaction systems.

It is well known that high quality petroleum products in the gasoline boiling range including, for example, aromatic hydrocarbons such as benzene, toluene, and the xylenes are produced by the catalytic reforming process. Typically, in such a process, a naphtha boiling range hydrocarbon fraction is passed to a reaction zone wherein it is contacted with a platinum-containing catalyst in the presence of hydrogen. Generally, the catalytic reforming reaction zone effluent, comprising gasoline boiling range hydrocarbons and hydrogen, is passed to a vapor-liquid equilibrium separation zone and is therein separated into a hydrogen-containing vapor phase and an unstabilized hydrocarbon liquid phase. A portion of the hydrogen-containing vapor phase is recycled to the reaction zone. The remaining hydrogen-containing vapor phase is available for use elsewhere in the petroleum refinery or petrochemical complex. Because the dehydrogenation of naphthenic hydrocarbons is one of the predominant reactions of the reforming process, substantial amounts of hydrogen are generated within the catalytic reforming reaction zone. Such dehydrogenation is extremely advantageous in that it provides hydrogen for use elsewhere in the refinery or petrochemical complex and results in the synthesis of valuable products, namely, aromatics. The aromatics generated within the catalytic reforming reaction zone, typically include benzene, toluene and the xylenes.

The aromatics formed within the catalytic reforming zone are the products of various concomitant reactions. These reactions include the dehydrogenation of naphthenes, the cyclization and dehydrogenation of straight chain paraffinic hydrocarbons, isomerization, and hydrogen transfer. In addition to these desirable reactions, catalytic reforming also involves hydrocracking among the products of which are relatively low molecular weight hydrocarbons including the normally gaseous hydrocarbons such as methane, ethane, propane and the butanes, substantial amounts of which are recovered in the hydrogen-containing vapor phase separated from the reforming reaction zone effluent.

As is well known in the art, the presence of hydrogen in the catalytic reforming reaction zone is beneficial in that it aids in suppressing the formation of carbonaceous compounds known as coke on the reforming catalyst. Accordingly, deposition of coke on the reforming catalyst is suppressed by high hydrogen partial pressures within the catalytic reforming reaction zone. However, the art has recognized that there are substantial aromatic yield advantages to be achieved by decreasing the hydrogen partial pressure within the catalytic reaction zone. As a result, the current trend in catalytic reforming is to increase the reaction severity within the catalytic reaction zone by operating at lower hydrogen partial pressures in order to promote the improved yields of desirable products.

The modern trend toward low hydrogen partial pressure operation of the catalytic reaction zone has however several operating disadvantages. As already mentioned, low hydrogen partial pressures tend to result in the increased deposition of coke on the reforming catalysts which results in a loss of activity. The art has addressed this problem by developing the so-called continuous catalytic reforming process wherein the reforming catalyst is continuously regenerated to maintain an acceptable level of activity. A second disadvantage of the high severity-low hydrogen partial pressure operation is the decrease in hydrogen purity of the hydrogen-containing vapor phase separated from the reaction zone effluent, typically by means of a vapor-liquid equilibrium separation zone. The reduction in hydrogen purity of the hydrogen-containing vapor phase is a result of the presence of the products formed by the hydrocracking function of the reforming catalyst emplaced within the catalytic reforming zone combined with the vapor-liquid equilibrium conditions within the vapor-liquid equilibrium separation zone. As noted above, these products typically comprise methane, ethane, propane and the butanes. The result of the presence of such low molecular weight hydrocarbons is an overall increase in the molecular weight of the hydrogen-containing vapor phase. Because a portion of the hydrogen-containing vapor phase is recycled back to the catalytic reforming reaction zone to provide at least a portion of the hydrogen necessary therefor, an increase in the molecular weight of the hydrogen-containing vapor phase necessarily results in increased utilities costs due to the increased work of compression for recycling of and increased heating and cooling of the hydrogen-containing vapor phase.

Aside from utility consumption considerations, the decrease in hydrogen purity may be disadvantageous by rendering that portion of the hydrogen-containing vapor phase not recycled to the reaction zone unusable without further processing. Accordingly, the only feasible use of the net hydrogen-containing vapor phase having low hydrogen purity may be as a fuel for the refinery or petrochemical complex fuel system. Although it admittedly has value as fuel, the hydrogen in a more pure form may be much more valuable if used in other petroleum refining or petrochemical processes. For example, it is expected that the increased demand for the distillate boiling range fuels will result in the need for increased hydrocracking capacity in many petroleum refineries. As is well known, the hydrocracking of heavy petroleum fractions consumes significant amounts of hydrogen. It would therefore be advantageous to obtain this hydrogen from the catalytic reforming process unit. Moreover, notwithstanding the general fluctuation in the deaand for petroleum crude oil, it is expected that more refractory crude oils will have to be relied on as refinery and petrochemical feedstocks. Such refractory crude oils require more hydroprocessing in converting them to usable products. In addition, it has become necessary to process the more refractory portions of crude oils, the so-called bottom of the barrel crude oil cuts. As with highly refractory crude oils, such fractions require significant hydroprocessing. Accordingly, it can be seen that the future demand for hydrogen will make its continued use as fuel for the refinery or petrochemical complex economically intolerable. It is therefore advantageous to devise a method of purifying the net hydrogen-containing vapor phase from the catalytic reformer to produce a hydrogen-rich gas stream which may be further utilized in the general upgrading of crude oils to more salable products.

OBJECTS AND EMBODIMENTS

A principal object of my invention is an improved process for producing a hydrogen-rich gas stream from the effluent of a catalytic reforming reaction zone. A corollary objective is to provide a novel catalytic reforming process which utilizes high purity hydrogen and operates at low pressure. Other objects in applying the invention include the increased production of hydrogen for further advantageous use. Accordingly, a broad embodiment of the present invention is directed toward a process for catalytic reforming comprising the steps of: (a) admixing substantially pure hydrogen with a naphtha boiling range feedstock; (b) contacting the resulting admixture with a reforming catalyst at catalytic reforming conditions in a catalytic reaction zone; (c) withdrawing a reaction zone effluent and passing the effluent to a vapor-liquid equilibrium separation zone to produce a hydrogen-containing vapor phase and a liquid hydrocarbon phase comprising unstabilized reformate; (d) passing at least a portion of the hydrogen-containing vapor phase to a hydrogen production/purification zone and reacting it therein to produce substantially pure hydrogen; and, (e) recycling at least a portion of the substantially pure hydrogen for admixture with the naphtha boiling range feedstock pursuant to step (a) above.

In an alternative and more specific embodiment, the present invention provides a process for catalytic reforming comprising the steps of: (a) admixing substantially pure hydrogen with a naphtha boiling range charge stock; (b) contacting the resulting admixture with a reforming catalyst at reforming conditions including a pressure of less than 100 psig in a catalytic reaction zone; (c) withdrawing a reaction zone effluent and passing the effluent to a first vapor-liquid equilibrium separation zone to produce a first hydrogen-containing vapor phase and a liquid hydrocarbon phase comprising unstabilized reformate; (d) compressing at least a portion of the first hydrogen-containing vapor phase and passing said portion to a second vapor-liquid equilibrium separation zone and withdrawing therefrom a second hydrogen-containing vapor phase having a higher hydrogen purity than said first hydrogen-containing vapor phase; (e) admixing said second hydrogen-containing vapor phase with a light hydrocarbon vapor stream and passing the resulting admixture to a hydrogen production/purification zone and reacting it therein to produce substantially pure hydrogen; (f) recycling at least a portion of the substantially pure hydrogen for admixture with the naphtha boiling range feedstock pursuant to step (a) above; (g) passing the liquid hydrocarbon phase from the first vapor-liquid equilibrium separation zone to a fractionation zone and withdrawing therefrom a net overhead vapor; and, (h) passing at least a portion of the fractionation zone net overhead vapor for admixture with the second hydrogen-containing vapor phase as at least part of the light hydrocarbon vapor stream pursuant to step (e) above.

These as well as other objects and embodiments will become evident from the following, more detailed description of the present invention.

INFORMATION DISCLOSURE

The prior art recognizes myriad process schemes for the obtention and purification of a hydrogen-rich gas stream from the effluent of hydrocarbon conversion reaction zones. U.S. Pat. No. 3,431,195, issued Mar. 4, 1969, discloses such a scheme. The hydrogen and hydrocarbon effluent of a catalytic reforming zone is first passed to a first vapor-liquid equilibrium separation zone from which zone is derived a first hydrogen-containing vapor phase and a first unstabilized hydrocarbon liquid phase. The hydrogen-containing vapor phase is compressed and recontacted with at least a portion of the liquid phase and the resulting mixture is passed to a second vapor-liquid equilibrium separation zone. Because the second zone is maintained at a higher pressure, a new vapor-liquid equilibrium is established resulting in a hydrogen-rich gas phase and a second unstabilized hydrocarbon liquid phase. A portion of the hydrogen-rich vapor phase is recycled back to the catalytic reforming reaction zone with the balance of the hydrogen-rich vapor phase being recovered as a hydrogen-rich gas stream relatively free of $C_3$–$C_6$ hydrocarbons.

U.S. Pat. No. 3,516,924, issued June 23, 1970, discloses a more complex system. In this reference, the reaction zone effluent from a catalytic reforming process is first separated in a vapor-liquid equilibrium separation zone to produce a hydrogen-containing vapor phase and an unstabilized liquid hydrocarbon phase. The two phases are again recontacted and again separated in a higher pressure vapor-liquid equilibrium separation zone. A first portion of the resulting hydrogen-rich vapor phase is recycled back to the catalytic reforming zone while the remaining portion of the hydrogen-rich vapor phase is passed to an absorber column in which stabilized reformate is utilized as the sponge oil. A high purity hydrogen gas stream is recovered from the absorption zone and the sponge oil, containing light hydrocarbons is recontacted with the hydrocarbon liquid phase from the first vapor-liquid equilibrium separation zone prior to the passage thereof to the second high pressure vapor-liquid equilibrium separation zone.

U.S. Pat. No. 3,520,800, issued July 14, 1980, discloses an alternative method of obtaining a hydrogen-rich gas stream from a catalytic reforming reaction zone effluent. As in the previously discussed methods, the reforming reaction zone effluent is passed to a first vapor-liquid equilibrium separation zone from which is obtained a first hydrogen-containing vapor phase and a first unstabilized hydrocarbon liquid phase. The hydrogen-containing vapor phase is compressed and recontacted with the hydrocarbon liquid phase. Thereafter the mixture is passed to a second vapor-liquid equilibrium separation zone maintained at a higher pressure than the first vapor-liquid equilibrium separation zone. A second hydrogen-containing vapor phase of higher hydrogen purity is recovered from the second vaporliquid equilibrium separation zone with a portion thereof being recycled back to the catalytic reforming reaction zone. The remaining amount of the resulting hydrogen-containing vapor phase is passed to a cooler wherein the temperature of the phase is reduced at least 20° F. lower than the temperature maintained in the second vapor-liquid equilibrium separation zone. After cooling, the hydrogen phase is passed to a third vapor-liquid equilibrium separation zone from which a high purity hydrogen gas stream is recovered.

U.S. Pat. No. 3,520,799, issued July 14, 1970, discloses yet another method for obtaining a high purity hydrogen gas stream from a catalytic reforming reaction zone effluent As in all the previous schemes, the reaction zone effluent is passed to a low pressure vapor-liquid equilibrium separation zone from which is produced a hydrogen-containing vapor phase and an unstabilized liquid hydrocarbon phase. After compression, the hydrogen-containing vapor phase is recontacted with the unstabilized liquid hydrocarbon phase and the resulting mixture is passed to a high pressure vapor-liquid equilibrium separation zone. A second hydrogen-containing vapor phase is produced of higher purity than the hydrogen-containing vapor phase from the low pressure vapor-liquid equilibrium separation zone. A first portion of this higher purity hydrogen-containing vapor phase is recycled back to the catalytic reforming zone. The balance of the higher purity hydrogen-containing vapor phase is passed to an absorption zone where it is contacted with a mean sponge oil preferably comprising $C_6$-plus hydrocarbons. A hydrogen-containing gas stream is removed from the absorber and after cooling, passed to a third vapor-liquid equilibrium separation zone. The sponge oil, containing constituents absorbed from the higher purity hydrogen-containing vapor phase is removed from the absorption zone and is admixed with the unstabilized liquid hydrocarbon stream from the low pressure vapor-liquid equilibrium separation zone prior to the recontacting thereof with the compressed hydrogen-containing vapor phase. A stream of high purity hydrogen gas is removed from the third vapor-liquid equilibrium separation zone.

U.S. Pat. No. 3,882,014, issued May 6, 1975 discloses another method of obtaining a high purity hydrogen stream from the reaction zone effluent of a catalytic reforming process. The catalytic reforming reaction zone effluent is first passed to a vapor-liquid equilibrium separation zone from which is recovered an unstabilized liquid hydrocarbon stream and a hydrogen-containing vapor phase. After compression, the hydrogen-containing vapor phase is passed to an absorption zone wherein it is contacted with a sponge oil comprising stabilized reformate. A high purity hydrogen gas stream is recovered from the absorption zone with one portion thereof being recycled back to the catalytic reforming reaction zone while the remainder is recovered for further use. A liquid stream is recovered from the absorption zone and admixed with the unstabilized liquid hydrocarbon stream from the vapor-liquid equilibrium separation zone. The admixture is then fractionated in a stabilizing column to produce the stabilized reformate, a first portion of which is utilized as the sponge oil in the absorption zone.

More recent, U.S. Pat. No. 4,212,726, issued July 15, 1980, discloses yet another variation of the previously described methods for recovering high purity hydrogen streams from catalytic reforming reaction zone effluents. In this reference, the reaction zone effluent from the catalytic reforming process is passed to a first vapor-liquid equilibrium separation zone from which is recovered a first unstabilized hydrocarbon stream and a first hydrogen-containing vapor stream. After compression, the hydrogen-containing vapor stream is passed to an absorption column wherein it is contacted with the first liquid hydrocarbon phase from the vapor-liquid equilibrium separation zone and stabilized reformate. A high purity hydrogen gas stream is recovered from the absorption zone with one portion being recycled back to the reaction zone and the balance being recovered for further use.

U.S. Pat. No. 4,364,820, issued Dec. 21, 1982, discloses a more complex method of recovering high purity hydrogen gas from a catalytic reforming reaction zone effluent. In this reference, the reaction zone effluent is first separated in a vapor-liquid equilibrium separation zone into a first hydrogen-containing vapor phase and a first liquid hydrocarbon phase. One portion of the first hydrogen-containing vapor phase is compressed and recycled back to the catalytic reaction zone. The balance of the hydrogen-containing vapor phase is compressed and contacted with a second liquid hydrocarbon phase recovered from a hereinafter described third vapor-liquid equilibrium separation zone. The admixture is then passed to a second vapor-liquid equilibrium separation zone from which is derived a third liquid hydrocarbon phase comprising unstabilized reformate and a second hydrogen-containing vapor phase of higher purity than the first hydrogen-containing vapor phase derived from the first vapor-liquid equilibrium separation zone. The second hydrogen-containing vapor phase is subjected to compression and then contacted with the first liquid hydrocarbon phase from the first vapor-liquid equilibrium separation zone. The resulting admixture is then passed to a third vapor-liquid equilibrium separation zone from which is derived a hydrogen gas stream of high purity and the aforementioned second liquid hydrocarbon phase.

Recent U.S. Pat. No. 4,374,726, issued Feb. 22, 1983, discloses a further method of obtaining a high purity hydrogen gas stream from the reaction zone effluent of a catalytic reforming process. In this reference, the reaction zone effluent is passed to a vapor-liquid equilibrium separation zone to produce a first hydrocarbon liquid phase and a hydrogen-containing vapor phase. A first portion of the hydrogen-containing vapor phase is compressed and recycled to the catalytic reforming reaction zone. A second portion of the hydrogen-containing vapor phase is compressed and thereafter recontacted with the first liquid hydrocarbon phase from the vapor-liquid equilibrium separation zone. The resulting admixture is then passed to a second vapor-liquid equilibrium separation zone to produce a hydrogen gas stream of high purity and a second liquid hydrocarbon phase comprising unstabilized reformate.

Also of interest is U.S. Pat. No. 3,364,137, issued Jan. 16, 1968, which discloses a catalytic reforming process which utilizes substantially pure hydrogen on a once-through basis. Moreover, this reference discloses that the hydrogen may be derived from a hydrogen-producing process such as steam reforming. In addition, the reference discloses that the normally gaseous portion of the catalytic reforming zone effluent may be passed to the hydrogen separation facilities of the hydrogen plant and recycled to the catalytic reforming reaction zone. The reference, however, does not teach the conversion to hydrogen of the light hydrocarbons in the normally gaseous portion of the reforming reactor effluent nor does it disclose the recycling to the reforming reaction zone of hydrogen so produced.

In brief summary then, the art which has employed various hydrogen purification aethods to produce a hydrogen stream of high purity for use in catalytic reforming of a naphtha boiling range charge stock is not cognizant of the present inventive technique in which a hydrogen-containing vapor phase recovered from the reforming reaction zone effluent is passed to a hydrogen production/purification zone wherein it is reacted to produce substantially pure hydrogen.

SUMMARY OF THE INVENTION

To reiterate briefly, the process encompassed by my inventive concept is suitable for use in catalytic reforming and in particular for use in low pressure catalytic reforming. Moreover, the present invention may be advantageously utilized to provide a source of hydrogen for other petroleum refining or petrochemical processes.

The art of catalytic reforming is well known to the petroleum refining and petrochemical processing industry. Accordingly, a detailed description thereof is not required herein. In brief, the catalytic reforming art is largely concerned with the treatment of a petroleum gasoline fraction to improve its anti-knock characteristics. The petroleum fraction may be a full boiling range gasoline fraction having an initial boiling point of from about 50° to about 100° F. and an end boiling point from about 325° to about 425° F. More frequently, the gasoline fraction will have an initial boiling point of about 150° to about 250° F. and an end boiling point of from about 350° to about 425° F., this higher boiling fraction being commonly referred to as naphtha. The reforming process is particularly applicable to the treatment of those straight run gasolines comprising relatively large concentrations of naphthenic and substantially straight chain paraffinic hydrocarbons which are amenable to aromatization through dehydrogenation and/or cyclization. Various other concomitant reactions also occur, such as isomerization and hydrogen transfer, which are beneficial in upgrading the anti-knock properties of the selected gasoline fraction In addition to improving the anti-knock characteristics of the gasoline fraction, the tendency of the process to produce aromatics from naphthenic and paraffinic hydrocarbons makes catalytic reforming an invaluable source for the production of benzene, toluene, and xylenes all of great utility in the petrochemical industry.

Widely accepted catalysts for use in the reforming process typically comprise platinum on an alumina support. These catalysts will generally contain from about 0.05 to about 5 wt. % platinum. More recently, certain promoters or modifiers, such as cobalt, nickel, rhenium, germanium, and tin, have been incorporated into the reforming catalyst to enhance its performance.

The catalytic reforming of naphtha boiling range hydrocarbons, a vapor phase operation, is effected in the presence of hydrogen and at conversion conditions which include catalyst bed temperatures in the range of from about 700° to about 1020° F.; judicious and cautious techniques generally dictate that the catalyst temperatures not substantially exceed a level of about 1020° F. Other conditions generally include a pressure of from about 50 to about 1000 psig, a liquid hourly space velocity (defined as volumes of fresh charge stock per hour per volume of catalyst particles in the reaction zone) of from about 0.2 to about 10 hr.$^{-1}$ and a hydrogen to hydrocarbon mole ratio generally in the range of from about 0.5:1 to about 10:1. As those possessing the requisite skill in the petroleum refining art are aware, continuous regenerative reforming systems offer numerous advantages when compared to the fixed bed systems. Among these is the capability of efficient operation at comparatively lower pressures—e.g. 50 to about 200 psig, preferably about 50 to about 100 psig—and higher liquid hourly space velocities—e.g. about 3 to about 10 hr.$^{-1}$. As a result of continuous catalyst regeneration, higher consistent inlet catalyst bed temperatures can be maintained —e.g. 950° to about 1010° F. Furthermore, there is afforded a corresponding increase in hydrogen production and concomitantly an increase in the yield of aromatics.

The catalytic reforming reaction is carried out at the aforementioned reforming conditions in a reaction zone comprising either a fixed or a moving catalyst bed. Usually, the reaction zone will comprise a plurality of catalyst beds, commonly referred to as stages, and the catalyst beds may be stacked and enclosed within a single reactor vessel, or the catalyst beds may each be enclosed in a separate reactor vessel in a side-by-side reactor arrangement. Generally, a reaction zone will comprise two to four catalyst beds in either the stacked and/or side-by-side configuration. The amount of catalyst used in each of the catalyst beds may be varied to compensate for the endothermic heat of reaction in each case. For example, in a three-catalyst bed system, the first bed will generally contain from about 10 to about 30 vol. %; the second, from about 25 to about 45 vol. %; and the third, from about 40 to about 60 vol. %, all percentages being based on the amount of catalyst within the reaction zone. With respect to a four-catalyst bed system, suitable catalyst loadings would be from about 5 to about 15 vol. % in the first bed, from about 15 to about 25 vol. % in the second, from about 25 to about 35 vol. % in the third, and from about 35 to about 50 vol. % in the fourth. The reactant stream, comprising hydrogen and the hydrocarbon feed, should desirably flow serially through the reaction zones in order of increasing catalyst volume with interstage heating. The unequal catalyst distribution, increasing in the serial direction of reactant stream flow, facilitates and enhances the distribution of the reactions.

Upon removal of the hydrocarbon and hydrogen effluent from the catalytic reaction zone, it is customarily subject to indirect heat exchange typically with the hydrogen and hydrocarbon feed to the catalytic reaction zone. Such an indirect heat exchange aids in the further processing of the reaction zone effluent by cooling it and recovers heat which would otherwise be lost for further use in the catalytic reforming process. Following any such cooling step which may be employed, the reaction zone effluent is passed to a vapor-liquid equilibrium separation zone to recover a hydrogen-containing vapor phase from the effluent. The vapor-liquid equilibrium separation zone is usually maintained at substantially the same pressure as employed in the reforming reaction zone, allowing for the pressure drop in the system. Accordingly, the trend toward low pressure drop operation for improved yields has led to lower pressures in the vapor-liquid equilibrium separation zone. The temperature within the vapor-liquid equilibrium separation zone is typically maintained at about 60° to about 120° F. Although the temperature and pressure are selected in order to produce a hydrogen-containing vapor phase and a principally liquid phase comprising unstabilized reformate, the trend toward low pressure operation of the catalytic reforming reaction zone has led to a hydrogen-containing vapor phase of increased molecular weight and decreased hydrogen purity. Traditionally, one portion of the hydrogen-containing vapor phase was recycled back to the reaction zone for admixture with the reaction charge; however, the increased compression requirements due to the increased molecular weight of the hydrogen-containing vapor phase has made such a step disadvantageous. Moreover, the lower hydrogen purity within the hydrogen-containing vapor phase requires greater mass flow through the reaction zone to achieve the same hydrogen to hydrocarbon molecular ratio. Thus, recycling of a hydrogen-containing vapor phase of decreased purity requires larger reactor vessels and greater heating and cooling duties. The principally liquid phase is passed to a fractionation zone from which a stabilized reformate product is recovered.

In accordance with the present invention, it is no longer considered prudent to recycle a portion of the hydrogen-containing vapor phase back to the reactor to provide the hydrogen requirements thereof. Instead of recycling the hydrogen-containing vapor phase, at least a portion thereof is passed to a hydrogen production/purification zone in which the hydrocarbons in the hydrogen-containing vapor phase are reacted to produce hydrogen which is recovered as a substantially pure stream and utilized to provide the hydrogen requirements for the reaction zone.

The hydrogen production/purification zone may comprise any suitable facility capable of producing substantially pure hydrogen from light hydrocarbons comprising $C_5$-hydrocarbons. As used herein, the phrase "substantially pure hydrogen" will mean a hydrogen purity of 95 mole % or greater. Many processes for the production and purification of hydrogen are known in the art and accordingly detailed explanation thereof is not considered necessary. One such process, catalytic steam-hydrocarbon reforming is capable of producing a hydrogen stream comprising 99.9 mole % hydrogen. In this process, light hydrocarbons are contacted with a nickel-containing catalyst at about 1200° to 1800° F. in the presence of steam to produce $CO_2$, $CO$, and hydrogen.

An alternative method of producing hydrogen is by the noncatalytic partial oxidation of hydrocarbons. The light hydrocarbons are subject to noncatalytic partial oxidation leaving a gas comprising hydrogen, carbon monoxide, and small traces of carbon dioxide, water vapor, and methane. Although this process may use a wide variety of feed hydrocarbons, it disadvantageously requires a stream of high purity oxygen.

As with the means of producing hydrogen-bearing streams, there are a number of purification techniques which aay be employed. The use of an adsorptive technique may be advantageously utilized when processing large volumes of gas. Adsorbents which may be employed to adsorb the impurities and purify the hydrogen include activated charcoal, activated alumina, and synthetic zeolites. In addition, a number of exotic methods exist. Alternatively, it is possible to employ absorbents to absorb the impurities admixed with the hydrogen produced. Application of such adsorption and absorption processes will result in hydrogen streams having 99.99 mole % hydrogen purity.

Irrespective of the particular means employed in the hydrogen production/purification zone, the hydrogen-containing vapor phase may comprise only a portion of the total feed thereto. For example, if a hydrocracking process plant is located in the petroleum refinery, the hydrogen consumption of such a process may be very great. In such a case, it may be necessary to feed natural gas or other suitable feed to the hydrogen production/purification zone since the hydrogen-containing vapor phase may be insufficient to provide the necessary quantity of hydrogen for that unit. Additionally, it is preferred that the net fractionation zone overhead vapor stream be fed to the hydrogen production/purification means to assure recovery of the trace amounts of hydrogen therein.

To more fully demonstrate the attendant advantages of the present invention, the following example, based on engineering calculations, is set forth.

BRIEF DESCRIPTION OF THE DRAWING

In further describing the present inventive concept, reference will be made to the accompanying drawing which serves to illustrate one or more embodiments thereof. Although the drawing depicts a specific catalytic reforming process, there is no intent to limit the invention to the specific arrangement so depicted and it is to be understood that the present invention has broad applicability to the art of catalytic reforming in general.

The figure in the drawing depicts a simplified schematic flow diagram of a catalytic reforming process in accordance with the present invention in which only principal pieces of equipment are shown. These are charge heater 4, catalytic reaction zone 6, first vapor-liquid equilibrium separation zone 11, second vapor-liquid equilibrium separation zone 16, debutanizer fractionation column 20, and hydrogen production and purification zone 36. In addition, indirect heat exchanger 2, air cooler 9, reciprocating compressors 13 and 39, cooler 15, reboiler heater 24, and overhead receiver 27 are depicted. Details such as miscellaneous pumps, heaters, coolers, valving, startup lines, and similar hardware have been omitted as being nonessential to a clear understanding of the techniques involved. The utilization of such appurtenances, to modify the illustrated process, is well within the purview of one skilled in the art, and will not remove the resulting process beyond the scope and spirit of the appended claims.

DETAILED DESCRIPTION OF THE DRAWING

Specifically referring now to the drawing, a naphtha boiling range charge stock is introduced via line 1 and mixed with a stream of substantially pure hydrogen (99.9 mole % hydrogen) from line 41. The resulting admixture is passed to indirect heat exchange means 2 and is preheated therein from a temperature of about 200° F. to a temperature of about 840° F. by indirect heat exchange with the effluent of reaction zone 6.

The preheated naphtha/hydrogen admixture is then passed to charge heater 4 via line 3. Fired heater 4 is an oil fired heater in this instance but may of course be any suitable heater. In charge heater 4, the naphtha/hydrogen admixture is heated to the desired reactor inlet temperature which is 1010° F. in this instance. After heating to the inlet temperature, the reactant admixture is passed to reaction zone 6 via line 5. For purposes of convenience, reaction zone 6 has been depicted as a single vessel; however, as noted previously, the reaction zone may consist of two or more catalyst beds in sideby-side or stacked configuration with inter-catalyst bed heating means. Generally, such heating means comprise fired heaters which are associated with the charge heater. Moreover, the catalyst may be emplaced in a fixed catalyst bed or the catalyst may be movable through the catalyst beds via gravity flow pursuant to the so-called continuous regenerative reforming process in which the catalyst is continuously regenerated.

Regardless of the configuration of reaction zone 6, the reaction zone effluent at a temperature of about 918° F. is passed via line 7 to heat exchange means 2. In heat exchange means 2, the reaction zone effluent is utilized to preheat the naphtha/hydrogen charge admixture. The reaction zone effluent leaves heat exchange means 2 via line 8 at a temperature of about 260° F. In order to facilitate the separation of the reaction zone effluent, it is further subjected to cooling via heat exchange with air in air cooler 9. The reaction zone effluent leaves air cooler 9 via line 10 at a temperature of about 100° F.

The reaction zone effluent is then passed to first vapor-liquid equilibrium separation zone 11 via line 10. Separation zone 11 is maintained at a pressure of about 45 psig. A first hydrogen-containing vapor phase is removed from separation zone 11 via line 12. The first hydrogen-containing vapor phase comprises in excess of about 2 wt. % of $C_5+$ hydrocarbons. These hydrocarbons are of more value as reformate product than as feed to a hydrogen production and purification zone. Accordingly, the hydrogen-containing vapor phase is compressed in reciprocating compressor 13 and thereafter passed to cooler 15 via line 14. The thusly cooled stream is then separated into a second hydrogen-containing vapor phase of greater hydrogen purity than the first hydrogen-containing vapor phase and a liquid phase comprising $C_5+$ hydrocarbons. The second hydrogen-containing vapor phase is withdrawn from vapor-liquid equilibrium separation zone 16 via line 34. The liquid hydrocarbon stream comprising $C_5+$ hydrocarbons is withdrawn from the second vapor-liquid equilibrium separation zone 16 via line 17.

The hydrocarbon stream from line 17 is admixed with an unstabilized reformate stream withdrawn from the first vapor-liquid equilibrium separation zone 11 via line 18. The resulting liquid hydrocarbon admixture is passed via line 19 to debutanizing fractionation column 20. A bottoms product comprising stabilized reformate is withdrawn from fractionation column 20 via line 21. A portion of the bottoms product is diverted through line 23 to reboiler heater 24. Reboiler heater 24 may be either a heat exchange means or a fired heater. In this instance, reboiler heater 24 is depicted as a heat exchange means. The bottoms product is heated therein by indirect heat exchange with the high pressure steam. The heated bottoms product then is returned to fractionation column 20 via line 25 in order to provide the reboiler heat requirements thereof. The balance of the bottoms product not diverted through line 23 is withdrawn from the process as a stabilized reformate product via line 22.

An overhead product stream comprising $C_4-$ hydrocarbons and hydrogen is withdrawn via line 26 from the top of fractionation column 20. The overhead product stream is thereafter condensed in a condensing means not depicted and passed into overhead receiver 27. A liquid phase comprising principally $C_3$ and $C_4$ hydrocarbons is withdrawn from overhead receiver 27 via line 28 with a first portion being returned to fractionation column 20 via line 29 and the balance being withdrawn from the process as an overhead product via line 30.

A vapor phase comprising $C_3-$ hydrocarbons and a trace aaount of hydrogen is withdrawn from overhead receiver 27 via line 31. The $C_3-$ vapor phase is thereafter admixed with a natural gas stream comprising principally methane from line 32. The natural gas stream is added to the vapor stream in line 31 because it is desired to produce more hydrogen than may be supplied by the hydrocarbon components generated within the reforming process. The excess hydrogen which will result therefrom may then be available for use elsewhere in the refinery. Accordingly, any suitable hydrocarbon may be passed to the hydrogen production and purification zone along with the light hydrocarbons generated in the reforming process. In the present example, the natural gas/overhead receiver gas admixture is passed via line 33 and further admixed with the second hydrogen-containing vapor phase from line 34. The resulting admixture is then passed to the hydrogen production and purification zone 36 via line 35.

In this particular instance, the hydrogen production and purification zone comprises a catalytic steam reforming hydrogen production process. Separation is effected by the use of a selective adsorbent. For purposes of simplicity, the hydrogen production and purification facilities have been depicted as a single box. However, it is well within the purview of one of ordinary skill in the art to determine the arrangement and configuration of zone 36. After processing the hydrocarbon/hydrogen admixture from line 35 and the hydrogen production and purification zone 36, there is derived a stream of 99.9 mole % purity of hydrogen which is withdrawn from zone 36 via line 37. A first portion of the substantially pure hydrogen stream is withdrawn via line 41 for admixture with the naphtha boiling range charge stock in line 1. The balance of the hydrogen not necessary to meet the reforming process hydrogen requirements is passed to reciprocating compressor 39 via line 38 where it is transferred via line 40 for further use throughout the refinery complex.

As can now be appreciated, the inventive concept allows the low pressure catalytic reforming of naphtha without the necessity of consuming large amounts of utilities in either purifying the hydrogen-containing vapor phase by compression and vapor-liquid equilibrium separations, or without the added expense of compressing a high molecular weight recycle gas back to the catalytic reaction zone. Because the hydrogen gas stream recycled via line 41 of the drawing is substantially pure, i.e. 99.9%, the work of compression is minimized. Moreover, it becomes evident that the inventive reforming process results in added production of hydrogen, a constituent of ever-increasing value in the refining and petrochemical industry.

I claim as my invention:
1. An improved process for catalytic reforming comprising the steps of:
   (a) admixing substantially pure hydrogen with a naphtha boiling range feedstock;
   (b) contacting the resulting admixture with a reforming catalyst at catalytic reforming conditions in a catalytic reaction zone;
   (c) withdrawing a reaction zone effluent and passing the effluent to a vapor-liquid equilibrium separation zone to produce a hydrogen-containing vapor phase and a liquid hydrocarbon phase comprising unstabilized reformate;

(d) passing at least a portion of the hydrogen-containing vapor phase to a hydrogen production/purification zone and reacting it therein to produce substantially pure hydrogen; and, (e) recycling at least a portion of the substantially pure hydrogen for admixture with the naphtha boiling range feedstock pursuant to step (a) above.

2. The process of claim 1 further characterized in that the pressure within the catalytic reaction zone is maintained at a pressure of about 50 to about 100 psig.

3. The process of claim 1 further characterized in that the catalytic reaction zone comprises three distinct catalyst beds.

4. The process of claim 1 further characterized in that the catalytic reaction zone comprises four catalyst beds.

5. The process of claim 1 further characterized in that the catalyst is movable through the catalytic reaction zone via gravity flow.

6. The process of claim 1 further characterized in that the hydrogen production/purification zone comprises a catalytic steam-hydrocarbon reforming process and an adsorption process to purify the resulting hydrogen.

7. The process of claim 1 further characterized in that the hydrogen production/purification zone comprises a noncatalytic hydrocarbon partial oxidation process and an adsorption process to purify the resulting hydrogen.

8. A process for catalytic reforming comprising the steps of:

(a) admixing substantially pure hydrogen with a naphtha boiling range charge stock;

(b) contacting the resulting admixture with a reforming catalyst at reforming conditions including a pressure of less than 100 psig in a catalytic reaction zone;

(c) withdrawing a reaction zone effluent and passing the effluent to a first vapor-liquid equilibrium separation zone to produce a first hydrogen-containing vapor phase and a liquid hydrocarbon phase comprising unstabilized reformate;

(d) compressing at least a portion of the first hydrogen-containing vapor phase and passing said portion to a second vaporliquid equilibrium separation zone and withdrawing therefrom a second hydrogen-containing vapor phase having a higher hydrogen purity than said first hydrogen-containing vapor phase;

(e) admixing said second hydrogen-containing vapor phase with a light hydrocarbon vapor stream and passing the resulting admixture to a hydrogen production/purification zone and reacting it therein to produce substantially pure hydrogen;

(f) recycling at least a portion of the substantially pure hydrogen for admixture with the naphtha boiling range feedstock pursuant to step (a) above;

(g) passing the liquid hydrocarbon phase from the first vapor-liquid equilibrium separation zone to a fractionation zone and withdrawing therefrom a net overhead vapor; and, (h) passing at least a portion of the fractionation zone net overhead vapor for admixture with the second hydrogen-containing vapor phase as at least part of the light hydrocarbon vapor stream pursuant to step (e) above.

9. The process of claim 8 further characterized in that the pressure within the catalytic reaction zone is maintained at a pressure of about 50 to about 100 psig.

10. The process of claim 8 further characterized in that the catalytic reaction zone comprises three distinct catalyst beds.

11. The process of claim 8 further characterized in that the catalytic reaction zone comprises four catalyst beds.

12. The process of claim 8 further characterized in that the catalyst is movable through the catalytic reaction zone via gravity flow.

13. The process of claim 8 further characterized in that the hydrogen production/purification zone comprises a catalytic steam-hydrocarbon reforming process and an adsorption process to purify the resulting hydrogen.

14. The process of claim 8 further characterized in that the hydrogen production/purification zone comprises a noncatalytic hydrocarbon partial oxidation process and an adsorption process to purify the resulting hydrogen.

15. The process of claim 8 further characterized in that at least a portion of the light hydrocarbon stream comprises natural gas.

* * * * *